United States Patent [19]

Haavisto

[11] Patent Number: 4,661,964
[45] Date of Patent: Apr. 28, 1987

[54] RESONANT WAVEGUIDE LASER GYRO WITH A SWITCHED SOURCE

[75] Inventor: John R. Haavisto, Scituate, Mass.

[73] Assignee: Northrop Corporation, Los Angeles, Calif.

[21] Appl. No.: 783,210

[22] Filed: Oct. 2, 1985

[51] Int. Cl.[4] .......................... H01S 3/083; G01B 9/02
[52] U.S. Cl. ........................................ 372/94; 356/350
[58] Field of Search ........................... 372/94; 356/350

[56] References Cited

U.S. PATENT DOCUMENTS 4,420,259 12/1983 Taylor ................................. 356/350

Primary Examiner—Gene Wan
Attorney, Agent, or Firm—Kenway & Jenney

[57] ABSTRACT

Passive ring resonator laser gyro. The gyro eliminates the need for separate frequency control devices for the two counter propagating beams. A semiconductor laser diode, the source, is switched between two frequencies and its output is coupled into a branching waveguide. The light in the waveguide is coupled into a resonant ring waveguide and then sampled by detectors. The laser current is switched at a fixed rate between two values. The values are selected such as to cause the laser output to switch between the resonant frequencies of the two directions of propagation in the ring. These values are determined by a resonance tracking servo. The disclosed laser gyro eliminates the need for active frequency controlled devices in the waveguide structure resulting in less noise, better signal, and reduced cost.

3 Claims, 4 Drawing Figures

RESONANT WAVEGUIDE LASER GYRO WITH A SWITCHED SOURCE

BACKGROUND OF THE INVENTION

The present invention relates to laser gyros and more particularly to a resonant waveguide laser gyro with a switched source.

In U.S. Pat. application Ser. No. 589,711 filed Mar. 15, 1984, and entitled "Thin Film Passive Ring Resonator Laser Gyro" there was disclosed a passive ring resonator laser gyro employing electro-optic modulators to provide frequency shifting of the laser beam by a linear change in phase with time. The use of active elements in the waveguide structure such as electro-optic modulators introduces noise which degrades the signal. In addition, the inclusion of active elements increases manufacturing complexity and cost.

It is therefore an object of the present invention to provide a passive ring resonator laser gyro without the need for active elements in the waveguide structure such as separate frequency control devices.

Yet another object of the invention is such a passive ring resonator laser gyro having less noise and therefore better signal quality.

It is still another object of the invention to provide such a laser gyro which is less complex to manufacture and has a lower cost.

SUMMARY OF THE INVENTION

The passive ring resonator laser gyro disclosed herein includes a semiconductor laser diode which is switched between two frequencies. The output of the laser diode is coupled into a branching waveguide. The light in this branching waveguide is coupled into a resonant ring waveguide so as to excite counter-propagating beams which are sampled by detectors monitoring the output of waveguides evanescently coupled to the ring waveguide. The laser current is switched at a fixed rate between two values corresponding to the resonant frequencies of the two directions of propagation in the waveguide ring. The current values are determined by a resonance tracking servo system. In one embodiment, the detector outputs are switched synchronously with the laser and a single servo loop is employed. In another embodiment, the laser input is switched from two parallel servo loops. Gyro rate information is read out by differencing the feedback signals in the servo loop. For amplitude insensitive servo control, the laser can be modulated and a phase sensitive demodulation used. In the two servo embodiment two different modulation frequencies can be used. Additional laser isolation may be included to reduce feedback.

BRIEF DESCRIPTION OF THE DRAWING

The invention disclosed herein will be better understood with reference to the drawing in which.

DESCRIPTION OF THE PREFERRED EMBODIMENT

Figure 1:
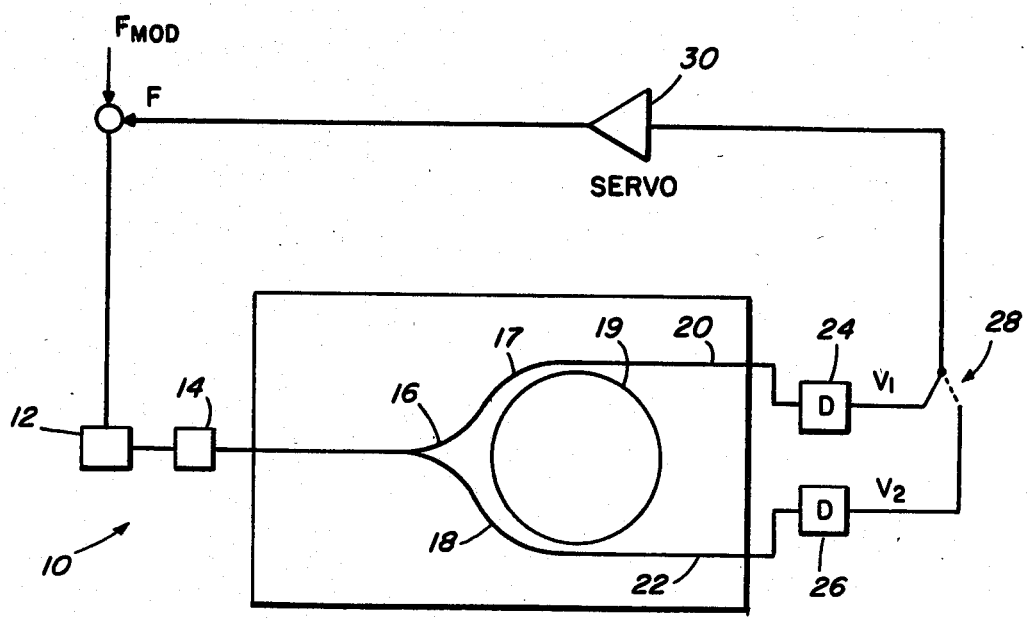
FIG. 1 is a schematic illustration of the laser gyro disclosed herein.

The present invention will be described first with reference to FIG. 1. A laser gyroscope 10 includes a semiconductor laser diode 12 which produces monochromatic laser light. Light from the laser 12 passes through an optional isolator 14 and then into a 3dB branching waveguide 16. The two waveguide branches 17 and 18 inject clockwise and counterclockwise light beams, respectively, by means of evanescent coupling into a ring waveguide 19. The outputs of the waveguides 20 and 22 are used for monitoring the light absorbed by the ring waveguide 18. The output of the waveguide 20 is connected to a detector 24 and the output of the waveguide 22 is connected to a detector 26. The output of detector 24 is a voltage $V_1$ and the output of the detector 26 is a voltage $V_2$. A switch 28 is provided for alternately connecting the voltages $V_1$ and $V_2$ to the input of a servo 30. The output of the servo 30 is compared with a reference frequency $F_{MOD}$ which is used to set the current input to the semiconductor laser diode 12.

Figure 2:
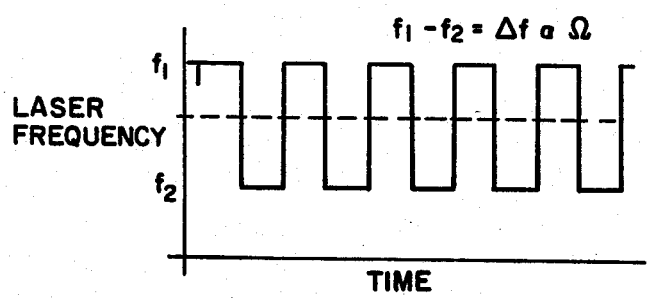
FIG. 2 is a graphical illustration of laser frequency versus time.
Figure 3:
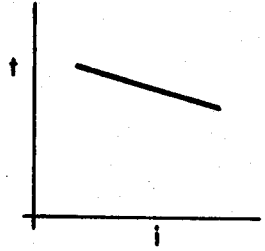
FIG. 3 is a graph of laser frequency versus input current.

As shown in FIG. 2, the frequency of the laser diode 12 is switched between the values $F_1$ and $F_2$ at regular intervals. The change in the frequency of the laser diode 12 is accomplished by altering the input current to the laser diode 12. This relationship is illustrated in FIG. 3 which shows that the frequency is substantially linearly related to the input current i.

In operation, the laser diode 12 current i is switched at a fixed rate between two values which are selected to correspond to the resonant frequencies of the two directions of propagation in the ring. Those skilled in the art will recognize that the effective path length in the ring waveguide 18 is different for the clockwise and counterclockwise beams when the gyro 10 has an angular velocity about an axis perpendicular to the plane of FIG. 1 resulting in different resonant frequencies for the counter propagating beams. The laser current values are determined by the resonance tracking servo 30. That is, the servo 30 adjusts the frequency of the laser diode 12 so that both the clockwise and counterclockwise beams propagating in the ring waveguide 18 are maintained on resonance. The switch 28 is operated synchronously with the switching of the laser frequency so that the counter propagating beams are maintained on resonance. The difference in the frequencies in the counter propagating beams, $F_1 - F_2$ is proportional to the angular rotation of the laser gyro 10 about an axis normal to the plane of FIG. 1.

Figure 4:
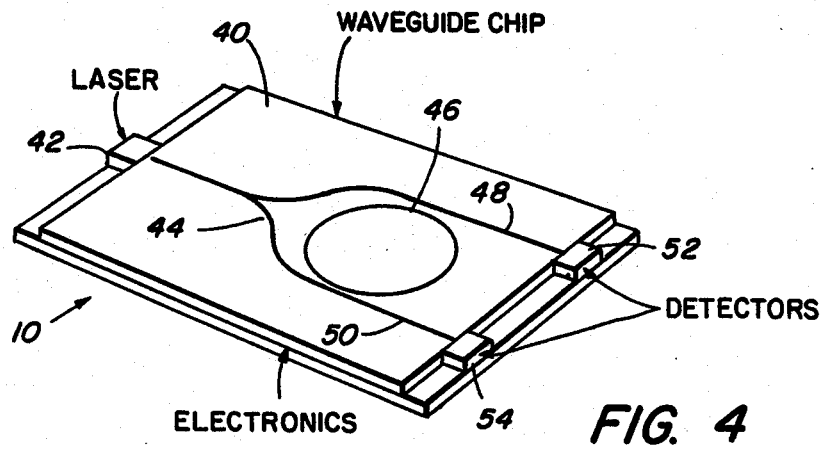
FIG. 4 is a perspective schematic illustration of a thin film embodiment of the present invention.

A physical implementation of the laser gyro disclosed herein is shown in FIG. 4. The laser gyroscope 10 is implemented on a substrate 40, preferably glass, and includes a gallium aluminum arsenide semiconductor laser 42. The output of the laser 42 is coupled into a branching waveguide 44 which evanescently couples into the ring waveguide 46. The ring waveguide 46 is preferably made by ion exchange. Light propagating in the waveguide 46 is monitored by output waveguides 48 and 50 and is detected by detectors 52 and 54. The output of the detectors 52 and 54 is used in conjunction with electronics (not shown) which may be included as part of the substrate 40. These electronics will implement the servo system discussed in FIG. 1.

Because the present invention eliminates the need for active elements such as electro-optic modulators for frequency shifting, the resulting laser gyro produces a better quality signal with less noise. In addition, cost is reduced because active elements are not required. In addition, the temporal isolation of the two resonant frequencies eliminates the beat phenomenon known in laser gyros occurring when counter propagating beams coexist in the resonant cavity. In addition, the temporal isolation reduces optical interactions such as the Kerr effects.

It is recognized that modifications and variations of the present invention will occur to those skilled in the art. It is intended that all such modifications and variations be included within the scope of the appended claims.

What is claimed is:

1. Laser gyro comprising:
   a laser;
   a ring waveguide;
   branching means for coupling light from the laser into the ring waveguide to generate counter propagating beams;
   output waveguides evanescently coupled to the ring waveguide for receiving light propagating in the ring waveguide;
   first and second detectors for detecting light in the output waveguide; and
   servo means responsive to the first and second detectors for adjusting the frequency of the laser to maintain counter propagating light beams on resonance within the ring waveguide.

2. The laser gyro of claim 1 in which the laser is switched between frequencies $F_1$ and $F_2$, where $F_1 - F_2$ is proportional to the angular rotation of the laser gyro.

3. The laser gyro of claim 1 further including an isolator interposed between the laser and the coupling means.

* * * * *